INVENTOR
Jozsef Meszaros

BY De Lio and Montgomery
ATTORNEYS

United States Patent Office 3,552,236
Patented Jan. 5, 1971

3,552,236
Z-AXIS CONTROL SYSTEM
Jozsef Meszaros, Simsbury, Conn., assignor to Pratt & Whitney Inc., West Hartford, Conn., a corporation of Delaware
Filed May 17, 1968, Ser. No. 729,994
Int. Cl. B23b 39/00
U.S. Cl. 77—4                                       8 Claims

ABSTRACT OF THE DISCLOSURE

This invention is directed to control system positioning for the quill of a jig borer. In particular, this invention utilizes a plurality of creep motors responsive to command signals from a control circuit. The control circuit continuously compares the position of the quill with the selected combination of spindle speed and quill feed. Depending on this combination, the creep motors assume control over the final positioning of the quill. For some combinations of the spindle feeds and speeds, the plurality of creep motors is energized periodically to bring the quill velocity to a required level for final positioning without loss of cycle time.

---

This invention relates to machine tool control systems and more particularly to a Z-axis control system for accurately positioning the quill of a jig borer or the like.

A jig borer is a machine specially constructed for boring holes in jigs, fixtures, dies, gages and accurate machine parts. In the past, jig borers have been manually operated but, in recent years as with most modern-day machine tools, they have been automatically operated from data feed into a control system. The data feed into the control system has usually been stored on tape but provision has also been made, in most cases, for data to be punched into active storage. The data placed in storage is used to generate control signals to cause the jig borer to bore a workpiece in a predetermined manner.

In the past, automatically controlled jig borers have been difficult to control in the Z direction (quill movement) so as to eliminate overshoot and undershoot problems. Such overshoot and undershoot problems are particularly critical if accurate holes are to be bored within required tolerances.

In order to provide a jig borer control system which alleviates overshoot and undershoot difficulties, a new and improved control system has been developed. The control system of this invention is capable of high positioning accuracy of the quill regardless of the feedrate selected. In particular, this invention utilizes a plurality of creep motors responsive to command signals from a control circuit. The control circuit continuously compares the position of the quill with the selected combination of spindle speed and quill feed. Depending on this combination, the creep motors assume control over the final positioning of the quill. For some combinations of the spindle feeds and speeds, the plurality of creep motors is energized periodically, to bring the quill velocity to a required level for final positioning without loss of cycle time.

Accordingly, it is an object of this invention to provide a new and improved system for controlling the position of the quill of a jig borer.

Another object of the invention is to provide a new and improved control system which will accurately position the quill of a jig borer.

A further object of this invention is to provide a control system for a jig borer which will accurately position a quill of a jig borer with a minimum of undershoot and overshoot.

Still other objects and advantages of this invention will in part be obvious and will in part be apparent from the specification.

The invention accordingly comprises the features of construction, combination of elements and arrangements of parts which will be exemplified in the construction hereinafter set forth and the scope of the invention will be indicated in the claims.

For a fuller understanding of the nature and objects of the invention, reference is had to the following description taken in connection with the accompanying drawings, in which.

Figure 1:
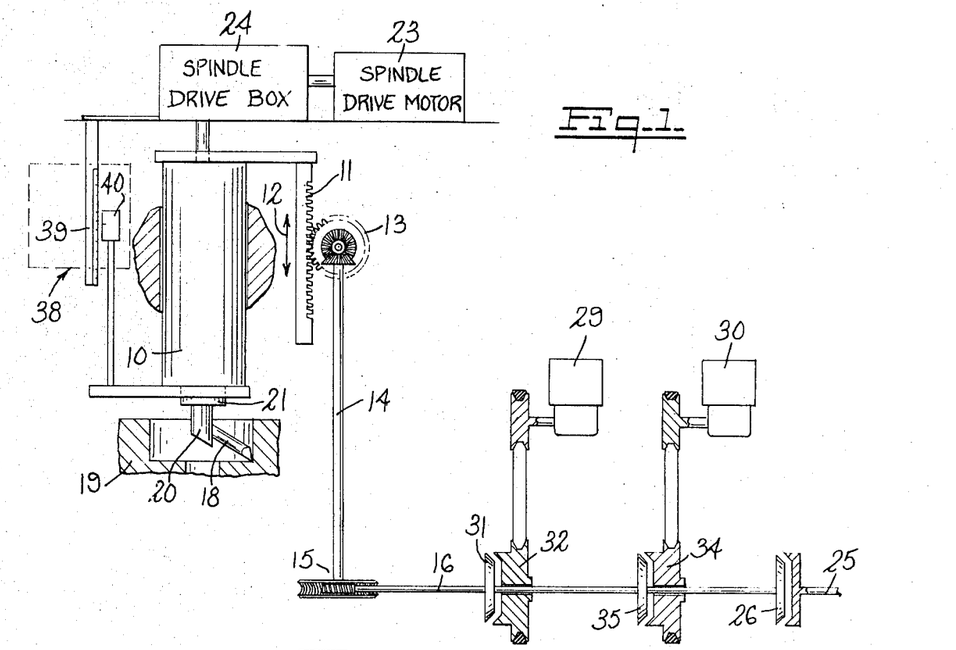
FIG. 1 is a diagrammatic showing of the electro-mechanical portion of the Z-axis control system according to the invention.

Referring to FIG. 1, there is shown in diagrammatic form, the mechanical parts of the system being controlled. A quill shown at 10 is supported from a rack 11, the quill being movable in a direction shown by the arrows 12 by a pinion 13 controlled by a shaft 14 and gear arrangement 15 which is, in turn, driven in a well known manner by a shaft 16. The shaft 16 provides the main drive for controlling the position of the quill, such as to feed a boring tool shown at 18 into a workpiece shown at 19. The tool 18 is held in a tool holder 20 which in turn is supported in a spindle 21. The spindle 21 is driven by a motor shown at 23 through a spindle drive box 24 in a well known manner.

Ordinarily, the quill is moved in the direction shown by the arrows through the shaft 16 by way of a driveshaft 25. The shaft 25 is disconnected from the shaft 16 by means of a clutch shown at 26, actuated at a predetermined time, which is a function of the distance of the boring tool from a workpiece. At the predetermined time, depending upon the feed rate and spindle speed selected, two motors 29 and 30 are actuated. The motor 29 (used for coarse feed control) is tied into the shaft 16 by way of a clutch shown at 31. The motor 29 drives a pulley 32 which is keyed to the clutch to rotate shaft 16. The motor 30 is used for fine-feed control and drives a pulley 34 which causes shaft 16 to rotate upon actuation of the fine-feed clutch shown at 35. The manner in which motors 29 and 30 are connected to the shafts by an electrically energized clutch is well known. Accordingly, a description of the electrical clutch mechanism is not included herein.

At 38 there is generally shown an optical system comprising a scale 39 and a reading head 40 for determining the distance of the quill or the tool from a predetermined position, such as the top of the table holding the workpiece. A more complete description of the optical system will be given in conjunction with the description of FIG. 2.

Figure 2:
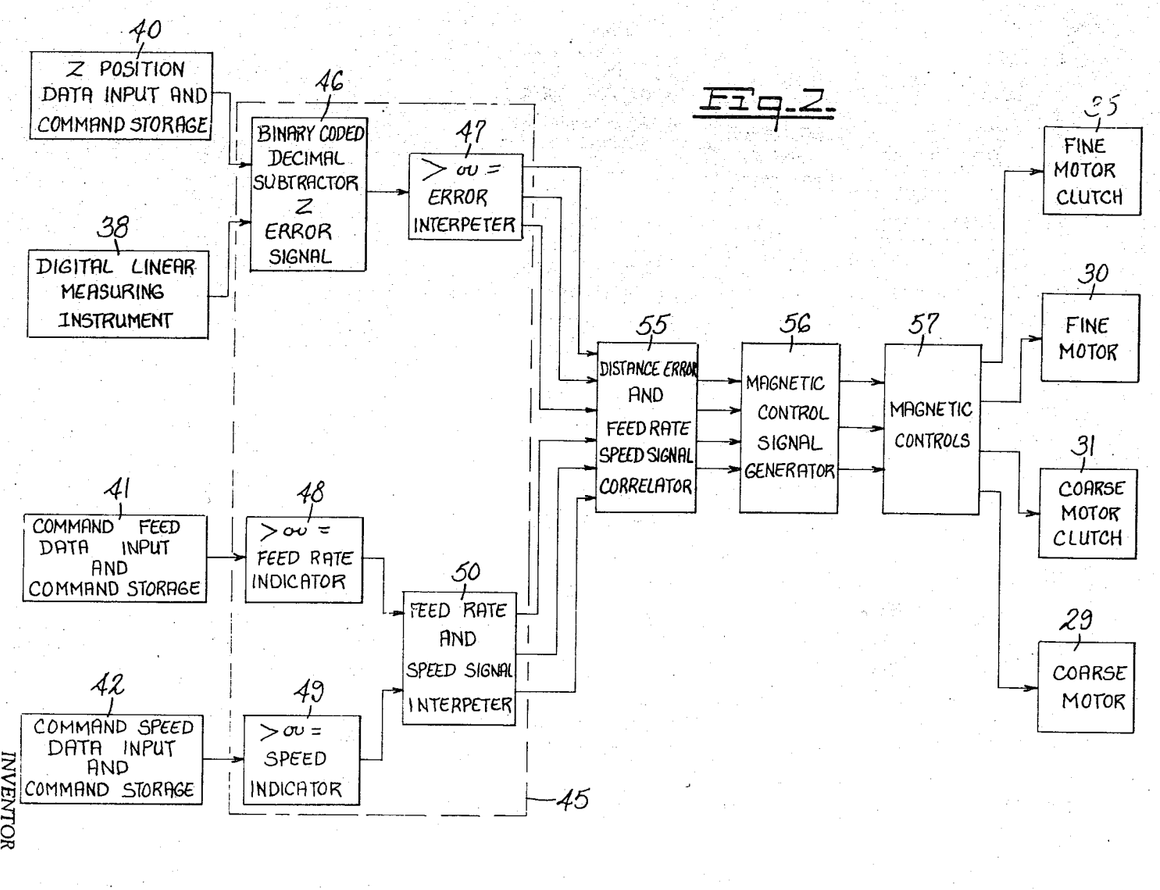
FIG. 2 is a block diagram showing the electrical logic of the invention.

Referring now to FIG. 2, there is shown in block diagram form, a system for controlling the motors described in conjunction with FIG. 1. The motors and respective clutches are shown at 29, 30, 31 and 35, respectively. The block marked digital linear measuring instrument, numbered 38 as in FIG. 1, is preferably the instrument called a "DIG" (trademark) prouduced by General Measurement Research, Inc., and distributed by Automatic Gages Inc., Rochester, N.Y. The DIG (digital linear measuring instrument) consists of three elements, a precision glass scale, a compact reading head and means for providing signals in a predetermined decimal coded format. In application, as shown, the DIG (TM) head and scale are mounted on separate machine elements, as shown in FIG. 1, moving in relation one to another. The reading head optically scans a scale and makes absolute determinations of position relative to a zero reference point on the scale. It is to be understood that other types of optical measuring instruments may be utilized as well as electronic measuring instruments, as long as a usable output signal is provided which indicates the absolute position of the quill with respect to the position of the workpiece.

Command information concerning the desired Z position of the quill is then inserted into the system by the use of push buttons, switches or, in the preferred case, a tape reader system. The Z position data input and command storage block is shown at 40. The tape reader can be of the type described and disclosed in the text "Digital Computer Fundamentals," 2d ed., Thomas C. Bartee, Harvard University, published by Mc-Graw Hill Company, New York. The command storage is basically an input/output register or buffer storage comprising a plurality of flip-flops or cores. For simplicity purposes, a buffer storage, comprising a plurality of flip-flops as described in the aforementiond text, is utilized. The desired final Z position for the tool with respect to the workpiece is set into storage prior to operation of the jig borer.

In order to provide command feed and command speed information to control the motors and clutches, there are provided a command feed data input and a command storage block, shown at 41, and a command speed data input and command storage block, shown at 42. The input information may be fed by means of pushbuttons, switches or tape readers and stored in buffer storage in the same manner mentioned with respect to the Z-position data input block 40.

In the system described herein, the operation has been set up such that the feed rate capable of being selected in in./rev. is limited to predetermined set values. The selected feed rate is stored in the block 41 in binary coded decimal format, such that only predetermined rates may be selected. With respect to the spindle speed, speeds greater than zero and less or equal to two thousand may be selected in r.p.m. These are also stored in the binary coded decimal format in the command storage block 42. The logic of the system is such that if a particular feed rate and a particular spindle speed are selected, a predetermined table signal (Table I, II or III) will be provided to control the motors and clutches in accordance with the position of the quill with respect to the workpiece at any particular time.

In essence, means are provided for recognizing the particular speed and feed selected in order to generate the table signals. The table signals are then used together with the input command information to control the motor operations. The groupings of feed rates and spindle speeds by table are shown below:

TABLE I

Particular condition

| Feedrate selected (in./rev.) Command storage: | Spindle speed selected (r.p.m.) |
|---|---|
| .0005—Feed 1 | 2000. |
| .0008—Feed 2 | 1250 and up. |
| .0013—Feed 3 | 770 and up. |
| .0020—Feed 4 | 500 and up. |
| .0035—Feed 5 | 287 and up. |
| .0060—Feed 6 | 167 and up. |
| .0100—Feed 7 | 100 and up. |
| .0150—Feed 8 | 67 and up. |

TABLE II

Particular condition

| Feedrate selected (in./rev.) | Spindle speed selected (r.p.m.) |
|---|---|
| .0005—Feed 1 | 40–2000 |
| .0008—Feed 2 | 25–1250 |
| .0013—Feed 3 | 15– 770 |
| .0020—Feed 4 | 10– 500 |
| .0035—Feed 5 | 10– 286 |
| .0060—Feed 6 | 10– 167 |
| .0100—Feed 7 | 10– 100 |
| .0150—Feed 8 | 10– 67 |

TABLE III

Particular condition

| Feedrate selected (in./rev.) | Spindle speed selected (r.p.m.) |
|---|---|
| .0005—Feed 1 | 40 and less. |
| .0008—Feed 2 | 25 and less. |
| .0013—Feed 3 | 15 and less. |
| .0020—Feed 4 | 10 and less. |

The dotted block 45 functions basically as a computer which may have a hard wire program or be programmable. In essence, the computer 45 continuously takes the information from the block 40 and the updated informatíon from block 38 and periodically subtracts the two signals to generate an error signal. Thereafter, the error signal is interpreted within the computer to detemine whether or not the error is greater than or equal to the following error in inches: .001, .004 and .130. It should be understood that the computer could be programmed to interpret different error values. The process determining whether the number is greater than or equal to is a simple process performed by any computer and is basically a subtraction process which will indicate whether the result of the subtraction is a negative or positive, or zero. Thus, there is indicated whether the numbers are greater than a particular number.

Figure 3:
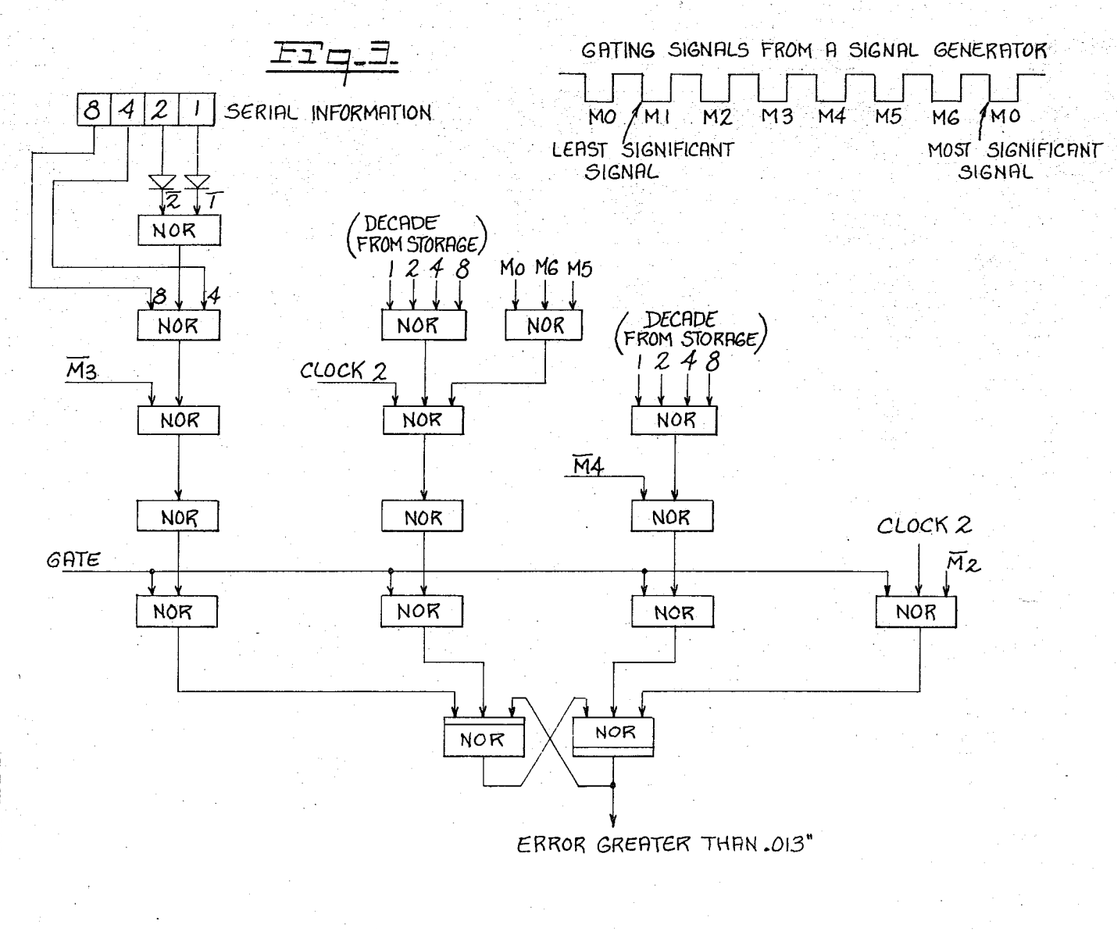
FIGS. 3–8 illustrate in logical block diagram form fixed or hard wired logic for accomplishing the logical functions illustrated in FIG. 2.

To accomplish this with a fixed or hard wired computer, there is shown a block marked 47 which represents a device for accomplishing this result. By way of example, reference should be had to FIG. 3, which shows a fixed logical system to determine whether or not the number is greater than 0.013 in. All the blocks shown in the diagram are NOR circuits, gated in a predetermined manner from a clock signal and time-sequenced signals. It should be obvious that the logic for determining whether the error is greater or less than the other numbers, is within the knowledge of one skilled in the art.

Figures 4, 5:
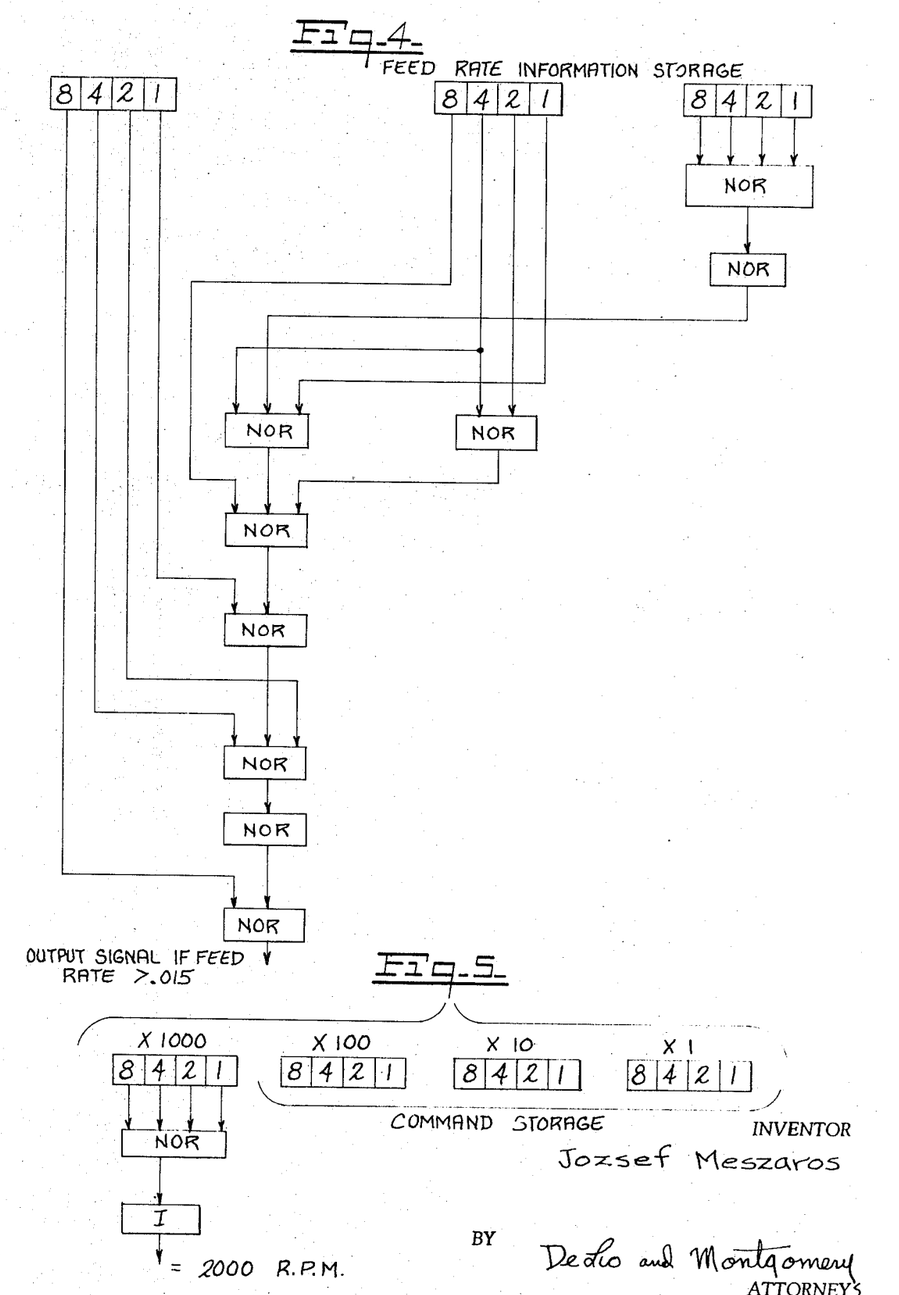
Figure 6A:
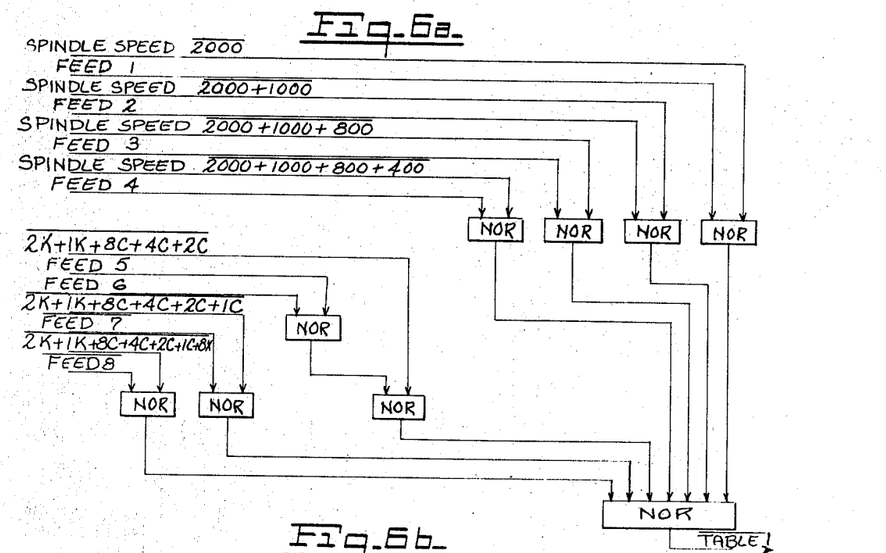
Figure 6B:
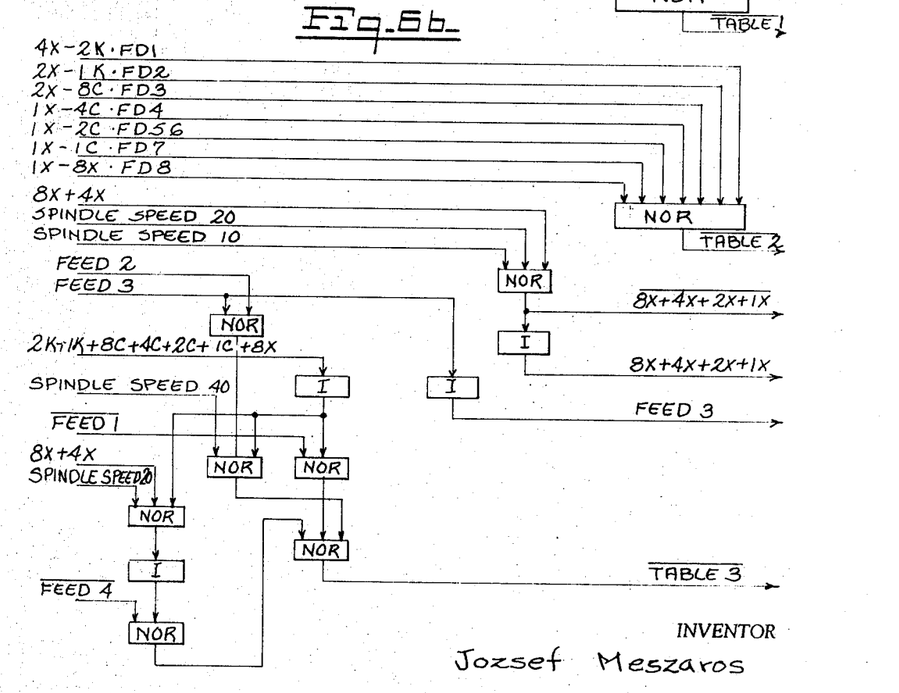
Figure 6C:
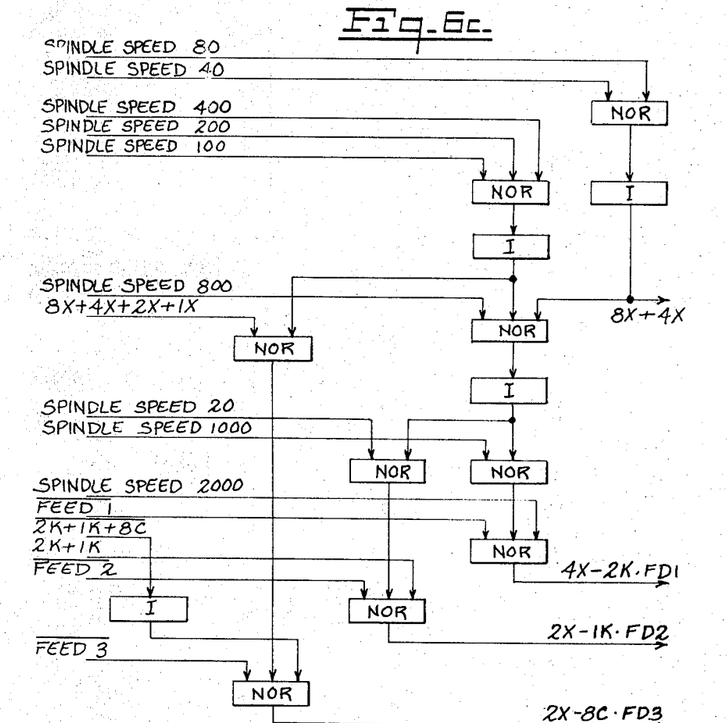
Figure 6D:
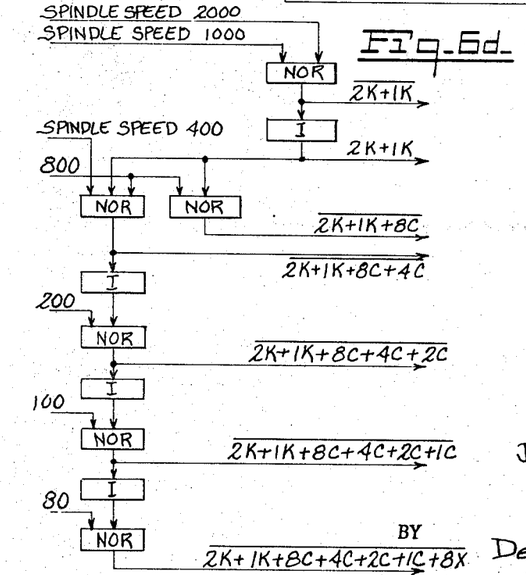
Figure 6E:
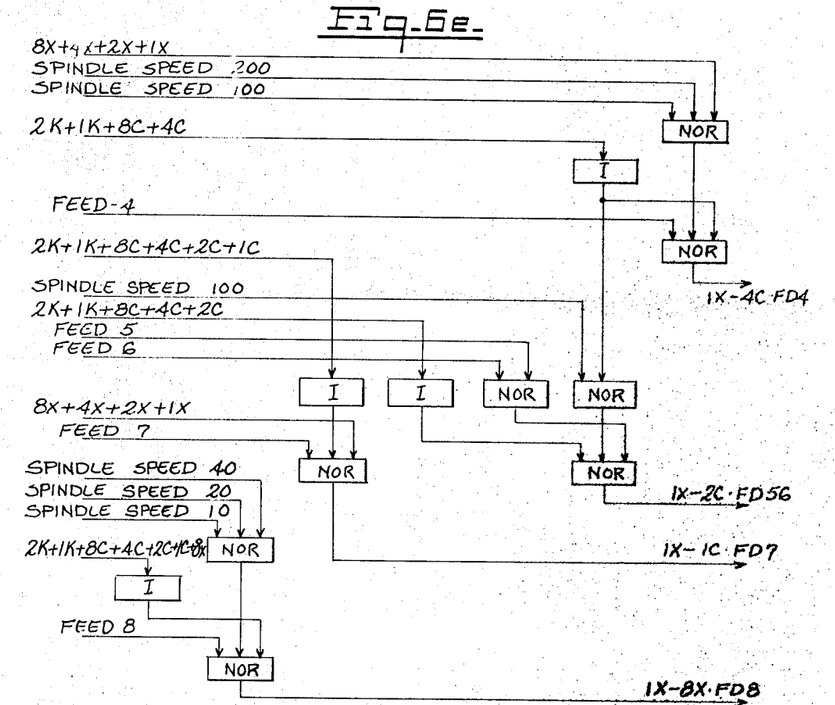

Referring to FIG. 2, the blocks 48–50 operate to determine in which table (I, II or III) the selected feed rate and spindle speed fit. The block 48 represents the symbol of a block which would indicate whether or not the command feed rate selected is greater than or equal to a predetermined number in in./rev. This is accomplished logically in a computer, by comparing stored numbers in the storage with the command feed information. Subtraction is effected to determine whether there is plus or minus sign in the arithmetic register or if there is a zero, to indicate whether the feed rate selected is greater than or equal to a predetermined number. The block 48 shown for accomplishing this, may also be a prewired system such as disclosed in FIG. 4. FIG. 4 is an example of the logic to determine whether or not the feed rate selected is greater than .015. Devices for determining whether or not the command feed is greater than any other predetermined numbers are easily constructed, using standard logical techniques.

The same holds true for the block 49, in that if a computer is used it will determine, using standard programming techniques, whether or not the spindle speed selected is greater than a predetermined number. The programming techniques for accomplishing this are well known in the computer field and any suitable computer with sufficient storage capacity, is capable of performing the simple functions required. A typical fixed or hard wired system for determining whether the spindle speed selected is greater than or equal to two thousand r.p.m. is shown in block form in FIG. 5.

Figure 7:
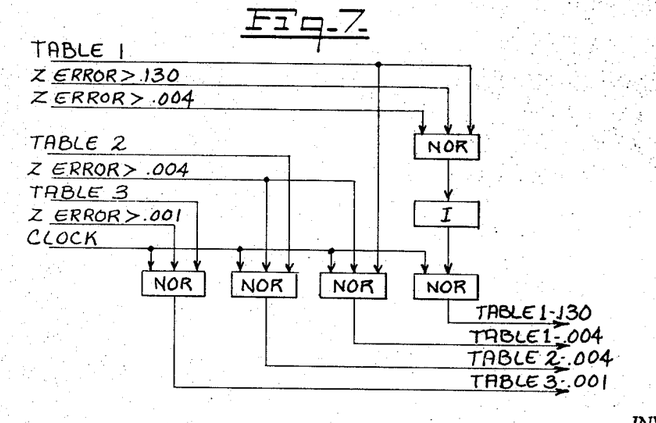
Figure 8:
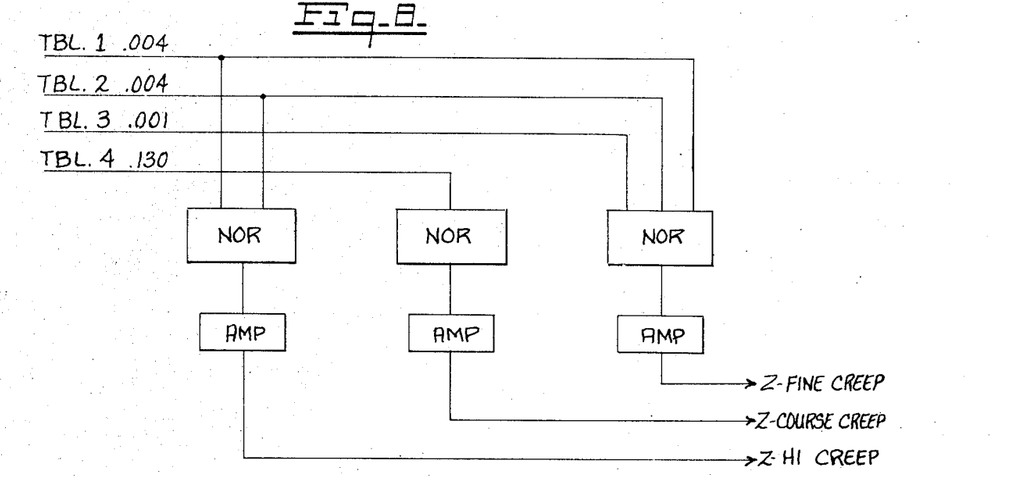
Figure 9:
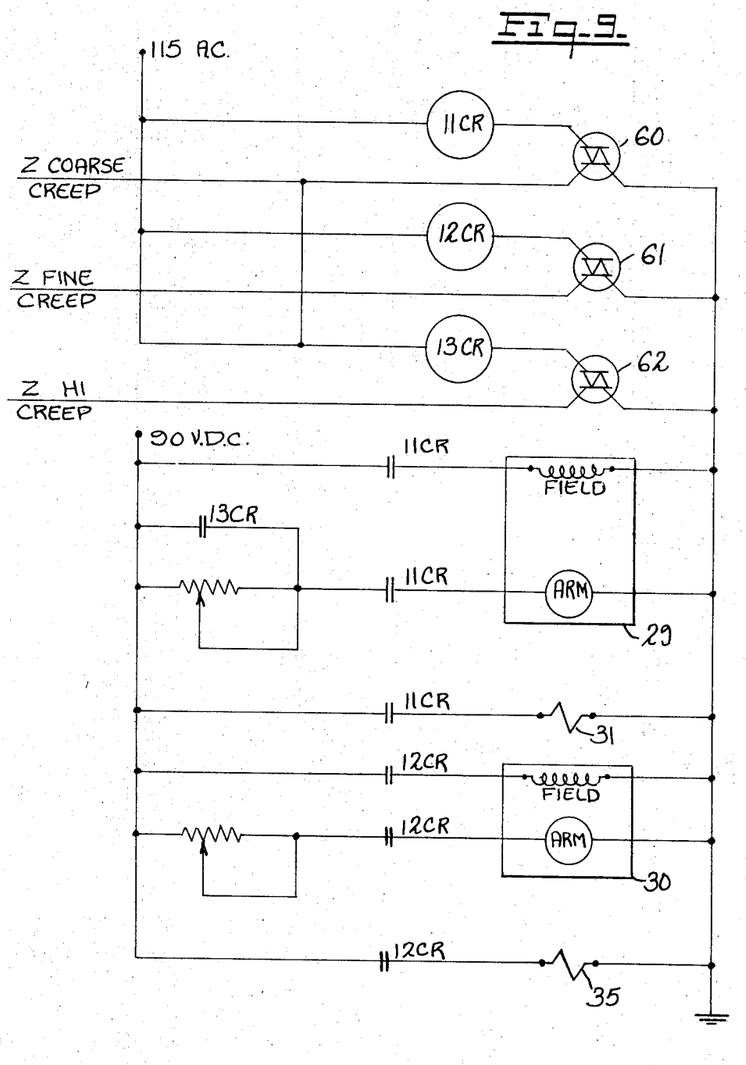
FIG. 9 is an electrical circuit diagram illustrating the device 56 of FIG. 2.

The block 50 indicates that a logical function is being performed to provide signals labeled Table I, II or III so as to indicate the table selected. This is accomplished by a computer, by simply referring to the storage tables and then making a logical comparison to determine that, for example, a command feed rate greater than .005 in./rev. has been selected and that a spindle speed in r.p.m. (i.e.) of two thousand has been selected. When this has been determined, the Table I signal will be provided. When the spindle speed selected is between 40 and less than 2,000 the Table II signal will be provided. If the spindle speed selected is 40 and less, a Table III signal will be provided. If, for example, the spindle speed selected is 40, Table II and Table III signals will be provided. If it is assumed that the computer used is a hard wire computer, FIG. 6 shows the example of the logical circuitry required to generate the Table I, II and III signals. It is believed the functional logic performed to accomplish this result is self-evident.

n the diagrams, the spindle speeds are shown as numbers 10, 20, 40, 80, 100, 200, 400, 1,000 and 2,000. For example, if a spindle speed of 500 is selected, a signal on the 400 and 100 lines will appear. Thereafter, the signals are provided to block 55 which correlates the error with the table signals. The structure for accomplishing this logically is shown in FIG. 7, using NOR logical circuits. In this manner, combined table and error signals are generated in accordance with the particular position of the quill with respect to the workpiece at any particular time and the feed rate and spindle speed selected. These signals are shown at the right of FIG. 7. The logical configuration chosen herein was determined as a matter of experience such that, by knowing the amount of error and the feed and speed rates, it was determined which motors should be called for to position the quill to avoid undershoot or overshoot. Thereafter, these signals are provided to a magnetic control signal generator shown at 56 and more particularly shown in FIG. 9. These signals are then provided to operate thyristors such as shown in FIG. 9 at 60–62, respectively, to control coils marked 11CR, 12CR and 13CR. In turn, these control relay contacts 11CR–13CR to operate the motors 29 and 30 and clutches 31 and 35, respectively.

It will thus be seen that the objects set forth above, among those made apparent from the preceding description, are efficiently attained and since certain changes may be mode in the above construction without departing from the spirit and scope of the invention, it is intended that all matter contained in the above description or shown in the accompanying drawings shall be interpreted as illustrative and not in a limiting sense.

It is also to be understood that the following claims are intended to cover all the generic and specific features of the invention herein described and all statements of the scope of the invention which, as a matter of language, might be said to fall therebetween.

What is claimed is:

1. A system for positioning a quill of a jig borer in the Z direction with respect to the workpiece, comprising support means for supporting a workpiece, means for supporting a quill having a spindle above said support means, positioning means for moving the quill toward said workpiece support means, said positioning means comprising creep means selectively operable in accordance with the distance of said quill from said workpiece and commanded spindle speed and quill feed rate.

2. A system in accordance with claim 1, including means for storing command quill feed rate information and means for storing command spindle speed information.

3. A system in accordance with claim 2, including means for storing desired final Z position information of said quill, means for providing periodically information concerning the instantaneous Z position of said quill with respect to said support means, and means for developing an error signal from the desired Z position information and the instantaneous Z position information to control the operation of said creep means.

4. A system in accordance with claim 3, including means for deriving an interpolated signal from said quill feed rate information and said spindle speed information, and means responsive to said interpolated signal and to said error signal for controlling the operation of said creep means.

5. A system in accordance with claim 4, wherein said creep means comprises a plurality of creep motors.

6. A system according to claim 1, comprising means for storing command feed rate information, means for storing command spindle speed information, means for storing final Z information, means for providing a first signal of the absolute position of said quill from said support means, means responsive to commanded Z position and said first signal for generating an error signal, and means responsive to said error signal and said commanded speed and feed rate information for controlling the operation of said creep means.

7. A system according to claim 6, in which interpreter means are provided for determining whether the command speed information and command feed information are related to each other in a predetermined manner, said interpreter means providing signals which are correlated with the error signal generated to control said creep means.

8. A system according to claim 7, in which the correlator means provides signals indicative of a predetermined relationship of said error signals and said signals from said interpreter.

References Cited

UNITED STATES PATENTS

| | | | |
|---|---|---|---|
| 3,016,778 | 1/1962 | Fitzner | 82—14 |
| 3,157,092 | 11/1964 | Mottu et al. | 90—13 |
| 3,173,315 | 3/1965 | Fuldner et al. | 77—32.1 |
| 3,318,195 | 5/1967 | Fitzner | 90—13 |

GERALD A. DOST, Primary Examiner

U.S. Cl. X.R.

77—32.1